United States Patent

Notheis et al.

(10) Patent No.: US 9,483,889 B2
(45) Date of Patent: Nov. 1, 2016

(54) METHOD FOR CONTROLLING AN ELECTRONICALLY SECURED DEVICE AND TRANSPONDER FOR IT

(71) Applicant: GM GLOBAL TECHNOLOGY OPERATIONS LLC, Detroit, MI (US)

(72) Inventors: Matthias Notheis, Nieder-Hilbersheim (DE); Andreas Heberer, Mainz (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 96 days.

(21) Appl. No.: 14/198,233

(22) Filed: Mar. 5, 2014

(65) Prior Publication Data

US 2014/0300446 A1    Oct. 9, 2014

(30) Foreign Application Priority Data

Mar. 5, 2013    (DE) .................. 10 2013 003 799

(51) Int. Cl.
- H04L 9/32    (2006.01)
- G07C 9/00    (2006.01)
- G06Q 30/06    (2012.01)
- B60R 25/00    (2013.01)

(52) U.S. Cl.
CPC ....... *G07C 9/00111* (2013.01); *G06Q 30/0645* (2013.01); *H04L 9/3226* (2013.01); *B60R 25/00* (2013.01); *H04L 2209/805* (2013.01); *H04L 2209/84* (2013.01)

(58) Field of Classification Search
CPC .......................... G06Q 30/0645; H04L 9/3226
See application file for complete search history.

(56) References Cited

U.S. PATENT DOCUMENTS

| 2002/0174077 A1* | 11/2002 | Yui ...................... G06Q 20/127 705/400 |
| 2005/0044906 A1 | 3/2005 | Spielman |
| 2006/0048233 A1 | 3/2006 | Buttross et al. |
| 2011/0112969 A1 | 5/2011 | Zaid et al. |
| 2011/0288891 A1* | 11/2011 | Zaid .................... G06Q 10/02 705/4 |
| 2014/0129113 A1* | 5/2014 | Van Wiemeersch .... F02D 28/00 701/102 |

FOREIGN PATENT DOCUMENTS

| DE | 10137579 A1 | 2/2003 |
| DE | 102005034477 A1 | 1/2007 |
| DE | 102010012565 A1 | 9/2011 |
| GB | 2402840 A | 12/2004 |

* cited by examiner

*Primary Examiner* — Andrew Bee
(74) *Attorney, Agent, or Firm* — Lorenz & Kopf LLP

(57) ABSTRACT

A method for controlling an electronically secured device by means of a transponder has the following procedural steps:
a) Access authorization information is sent from an electrical access management system to the transponder via a mobile communications link,
b) The access authorization information is received by the transponder,
c) The access authorization information is transmitted from the transponder to the device, and
d) A function of the device is activated if the received access authorization information matches reference information belonging to the device.

4 Claims, 5 Drawing Sheets

METHOD FOR CONTROLLING AN ELECTRONICALLY SECURED DEVICE AND TRANSPONDER FOR IT

CROSS REFERENCE TO RELATED APPLICATION

This application claims priority to German Patent Application No. 102013003799.9 filed Mar. 5, 2013, which is incorporated herein by reference in its entirety.

TECHNICAL FIELD

The present disclosure relates to a method for controlling an electronically secured device, as well as to a transponder suitable for implementing the method.

BACKGROUND

A transponder for controlling an engine immobilizer of a motor vehicle is known from DE 195 33 309 A1. This conventional transponder relays a fixed code and alternating code to a transceiver unit in the vehicle, whereupon the engine immobilizer enables motor vehicle startup if both codes match expectations. The same transponder can also be used for opening doors equipped with a corresponding transceiver unit in the household area, wherein transmitting only the fixed code is to suffice for opening these doors. While consideration has been given to the capability of changing the fixed code transmitted by the key given a change in vehicles, this can only be accomplished with a significant outlay, and relies upon compliance with safety measures aimed at preventing an inadvertent change, resulting in a situation where the transponder can no longer be used for opening the doors in the household area.

Transponder systems for actuating door locks are in widespread use in the hospitality industry. The transponders in such systems are traditionally designed as plastic cards the size of check cards with a data storage. Before such a transponder is given to a hotel guest as the key to his or her room, a recorder loads it with access authorization information specific to the door of the room along with time limit information. When the guest holds the transponder up to a reader on the lock to his or her room door, both pieces of information are transmitted, and the lock is opened if the access authorization information matches the room door, and the transmission takes place within a period of validity specified in the time limit information, i.e., within the envisaged timeframe in which the guest uses the room. The lock will not open after this time has expired. If a guest stays longer than specified by the loaded time limit information upon being given the transponder, he or she must switch the transponder or have new information recorded at reception. If a departing guest fails to return the transponder, this known transponder system allows a new tenant to use the same system with another transponder, and opening the door without authorization using the unreturned transponder is impossible. The problem with rental cars or vehicles in a company fleet or car sharing pool is that each person who would like to use a vehicle traditionally needs a suitable key. Since each person with a key can use the vehicle to which the key belongs, it makes sense to the operator of a car fleet for there to only be a small number of keys to each vehicle. This allows him or her to keep the rather high costs for the keys within limits on the one hand and on the other hand eliminates the risk of conflicts between potential users of a vehicle if only a single user is in possession of a key. At the same time, too low a number of keys impedes the efficient use of the fleet, since one user can prevent another from using a vehicle by not returning his or her key when done. The known transponder system described above is not suitable for vehicles, since a user can only procure a usable transponder where the recorder is located. However, he or she cannot automatically just proceed to the location of the vehicle if a previous user has not parked it at the site of the recorder. However, it would be highly appealing in particular to users in a car sharing pool to be able to decide whether or not they wish to use a parked vehicle in the pool at the location where they find it, potentially doing so right away.

SUMMARY

An object of the present disclosure is to indicate a method and means for its implementation, which enable an efficient utilization of a mobile device, in particular a motor vehicle, regardless of how conscientious or cooperative the individual users are.

Within the framework of a method for controlling an electronically secured device by mean of a transponder, the object is achieved in accordance with the following method: (a) access authorization information is sent from an electrical access management system to the transponder; (b) the access authorization information is received by the transponder; (c) the access authorization information is transmitted from the transponder to the device, and (d) a function of the device is activated if the received access authorization information matches reference information belonging to the device. Transmission in (a) takes place via a mobile communications link.

The method described above makes it possible to circulate a large number of transponders; since the ability to use the device does not depend on having a transponder, but rather on whether the transponder has the access authorization information, control over the ways in which a potential user can access the device remains with the access management system. Therefore, the owner of the device does not have to retrieve a transponder after it has been used by the user. As a result, the transponder can be in the possession of the users. The ability to use transponders procured by the users out of their own self-interest and at their own expense, in particular the use of mobile phones as transponders, can significantly reduce the costs of implementing the method.

The device to be controlled with the method is preferably a motor vehicle or a component thereof, in particular a lock or engine immobilizer. The transmission in (c) is preferably encrypted so as to make it harder for a transponder that fraudulently imitates the access authorization information to deceive the device to be controlled.

In addition to the access authorization information, the electronic access management system could of course also send out information that revokes the access authorization. However, since there is no guarantee that such a revocation will be received by the transponder via the mobile communications link, in particular if a user is obviously preventing the transponder from establishing a mobile communications link, it makes sense to transmit not just the access authorization information from the access management system to the transponder in (a), but also time limit information that specifies the period of validity for the access authorization information.

This allows the transponder to check this time limit information in (c), and transmit the access authorization information to the device only within the validity period of the access authorization information. Because the transponder no longer transmits the access authorization after the validity period has expired, it becomes ineffective, and the owner of the transponder, if he or she wishes to again use it to control the device, must request renewed transmission of access authorization and time limit information from the access management system.

As an alternative, the transponder can itself generate time limit information for this purpose upon receiving access authorization information from the access management system. This validity period can be shorter than a duration of use for the device agreed upon between the person having the transponder and the owner of the device; it would then be in the interest of the person having the transponder to make sure that the transponder can receive access authorization information repeatedly sent out by the access management system during the agreed period of use.

To make it harder for a manipulated transponder to deceive the device, it can make sense for the transponder to send the time limit information to the device, the device to check the time limit information, and only execute in (d) within the validity period of the access authorization information.

For this purpose, it is especially beneficial to have the time limit information and access authorization information be encrypted dependent on each other. Even if a malicious user manages to intercept the encrypted information transmitted in step c), the dependent encryption ensures that he or she will be unable to break the transmitted information down into access authorization and time limit information and manipulate the time limit information, thereby fraudulently allowing him or her continued use.

Also conceivable is for the device to itself generate time limit information after access authorization information has been received by the transponder when first implementing (c), and for the device to check the time limit information based on the same access authorization information when again implementing (c), and only implement (d) within the validity period of the access authorization information. This ensures that each piece of access authorization information is only valid for a limited time, so that, to be able to use the device for a longer time, the user must ensure that his or her transponder receives access authorization information newly sent out by the access management system in a timely fashion beforehand.

The present disclosure further relates to a transponder, with which the method described above can be implemented. Such a transponder encompasses a memory for storing access authorization information, a first communication interface for transmitting the access authorization to a device to be controlled, and a mobile communication interface as a second communication interface for receiving the access authorization.

The transponder is preferably a mobile phone. In addition to the mobile communications interface, modern mobile phones, in particular smart phones, often also have another communications interface for wirelessly communicating with other devices, e.g., via Bluetooth or WLAN, which can be used within the framework of the present disclosure for communicating with the device to be controlled. Therefore, such a smart phone only requires suitable programming to be able to work as a transponder within the framework of the present disclosure. The present disclosure thus further relates to a computer program product that encompasses instructions which, when executed on a computer, in particular a mobile computer, such as a smart phone, allow the latter to work as a transponder as described above or in a method as described above. For example, a car sharing provider can make such a computer program product available to his or her registered customers.

The present disclosure further relates to a computer readable data carrier, recorded on which are program instructions that allow a computer to work as a transponder or in a method as described above.

BRIEF DESCRIPTION OF THE DRAWINGS

The present disclosure hereinafter will be described in conjunction with the following drawing figures, wherein like numerals denote like elements, and.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
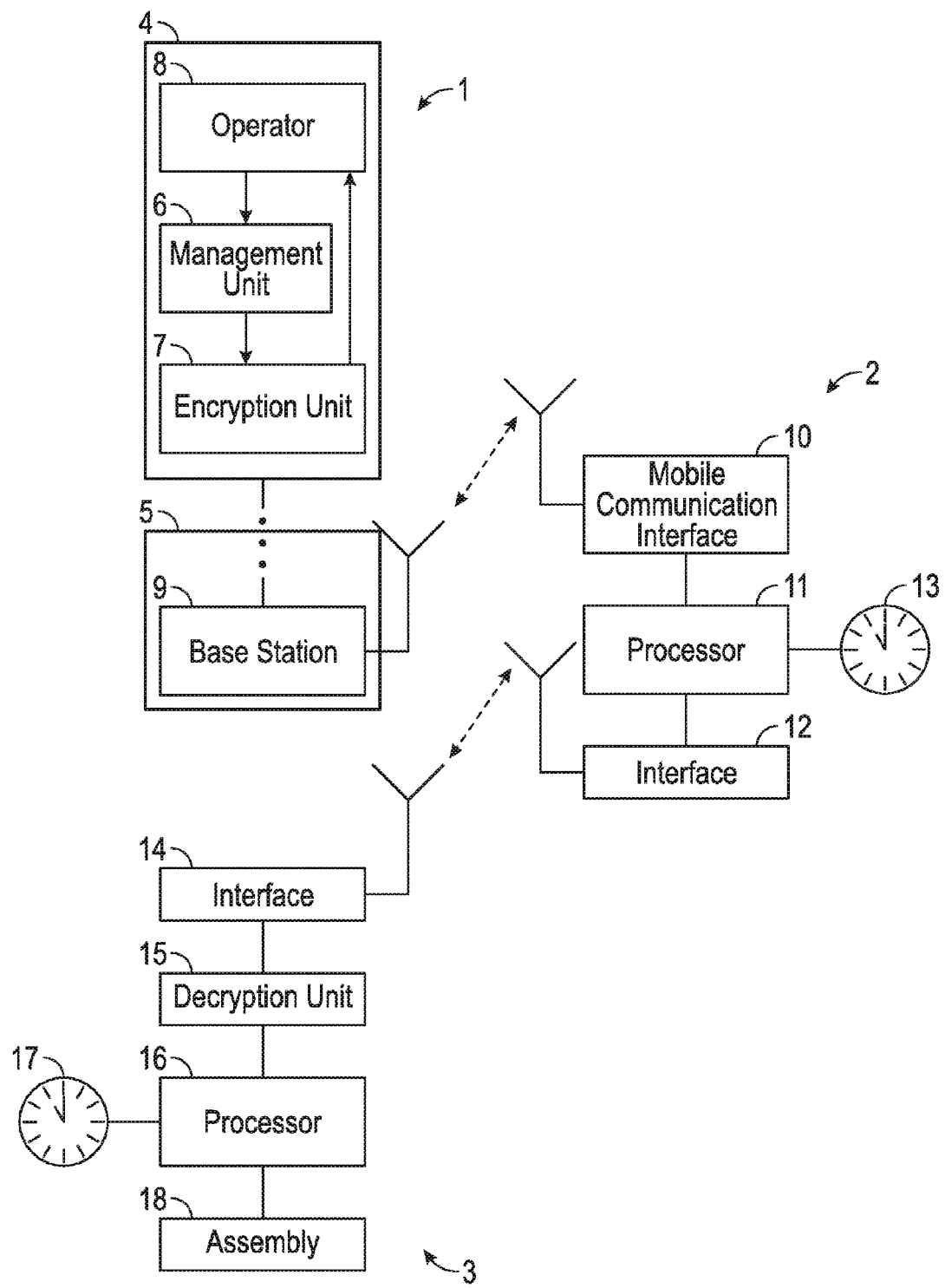
FIG. 1 is a block diagram of a system according to the present disclosure.

The system shown on FIG. 1 encompasses three types of components, an access management system 1, any number of transponders 2 desired, as well as devices 3 that can be controlled by the transponders 2. Further on, the description assumes that the transponders 2 are mobile phones, and the devices 3 to be controlled are motor vehicles in a fleet; the expert should have no difficulties applying the basic principles of the present disclosure described below to other types of transponders capable of mobile communications and devices to be controlled.

The access management system 1 encompasses a computer 4 of a known design, in particular a personal computer, and a mobile communication network 5, to which the computer 4 is connected for sending out messages, especially text messages. The computer encompasses a management unit 6 and preferably an encryption unit 7 for encrypting specific data in the messages to be sent out via the mobile communication network, as will be described in even greater detail below. A dataset is filed in a database of the management unit 6 for each of the devices 3 to be controlled. Each dataset contains publically known data specific to the device 3 to which the dataset belongs, for example, in the case of a motor vehicle, its license number and reference information not known to the public. In addition, the dataset can contain information about whether a user has access to the device or vehicle, the identity of this user and the period for which he or she has been granted this access.

An operator 8 receives applications from potential users for a grant of access. The users can use their mobile phones 2 and the mobile communication network 5 to send their applications to the operator 8. The operator 8 derives the user identity, possible vehicle preferences, and duration of the desired access from the application, and if he or she wants to grant access to the vehicle, inputs these data into the management unit 6. While the operator 8 can be a person using a management unit 6 to communicate via a conventional user interface of the computer, it can also take the form of a program running on the computer 4 or a second computer networked with the computer 4.

The management unit 6 determines whether a vehicle is present that satisfies the criteria indicated in the application. If such a vehicle is present, the management unit 6 outputs the reference information for the selected vehicle along with any other information explained in even more detail in conjunction with FIGS. 2 to 4 to the encryption unit 7. The management unit 6 uses the encrypted information to generate a text message, which is sent to the mobile phone 2 of the applicant over the mobile communication network 5. The call number of the phone 2 required for this purpose can be gleaned from the application, or from a dataset of the applicant stored in the management unit 6.

The mobile communication network 5 buffers the text message in a known manner until a base station 9 of the network with a range including the mobile phone 2 has been determined, and transmits the text message once a communication link to the mobile phone 2 has been established.

The mobile phone 2 encompasses a mobile communication interface 10, a processor 11 for processing the received text messages, along with an interface 12 for communicating with a vehicle 3. A timer 13 can be provided for specific embodiments of the operating method described below. The interface 12 is preferably wireless, e.g., a Bluetooth or WLAN interface; however, this does not preclude hard-wired communication with the vehicle 3.

The vehicle 3 encompasses an interface 14 complementary to the interface 12 of the transponder, preferably a decryption unit 15, a processor 16, optionally a timer 17, as well as an assembly 18 controlled by the processor 16, such as a door lock, an engine immobilizer or the like.

Various embodiments of operating methods for the system depicted on FIG. 1 will be explained below with reference to FIGS. 2 to 4. It is here assumed that the operator 8 has already received an application from a user for grant of access to a vehicle 3.

Figure 2:
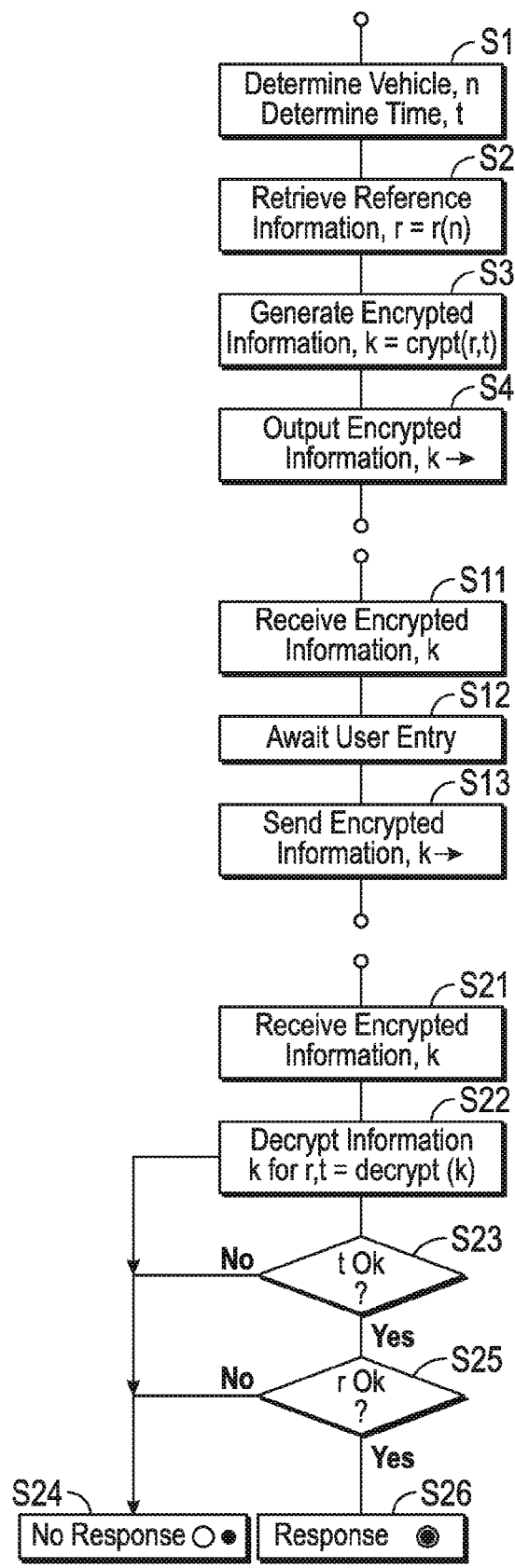
FIG. 2 is a flowchart depicting how the various system components shown on FIG. 1 operate according to a first embodiment.

In the method on FIG. 2, step S1 involves determining a vehicle 3 to which the user is to be granted access, along with how long this access is to be granted. The vehicle can be determined by having the operator 8 input the publically known designation n of the vehicle in question or by having the management unit 6 selects a suitable vehicle based on other specifications in the application or of the operator.

In step S2, the private reference information r relating to the selected vehicle n is retrieved from the database.

In step S3, encrypted information k is generated from the reference information r and timeframe t of the granted access. The encryption of r and t is interdependent, i.e., the encrypted information k does not contain any group of bits that would be independent of t and can be allocated only to r, making it impossible for an unauthorized party without knowledge of the encryption algorithm to generate valid encrypted information k' that corresponds to the same reference information r, but a different access authorization period t'.

In step S4, the encrypted information k is output to the mobile communication system 5 as a text message addressed to the mobile phone 2 of the user.

In this embodiment of the method, processing in the mobile phone 2 is limited to receiving the text message with the encrypted information k (step S11), waiting for the user to make an entry, e.g., press a key on the mobile phone 2 having assigned to it an "unlock vehicle door" or "disable engine immobilizer" function within the framework of the operating method according to the present disclosure, and, if such an entry takes place in step S12, sending out the encrypted information k (S13). Steps S12, S13 can be repeated as often and long as desired, even after time interval t has expired.

In step S21, the vehicle 3 receives the encrypted information k sent out by the transponder 2 in step S13. Information k is decrypted into r, t in step S22. If the decryption fails, for example because a manipulated value k' that is not a valid result of the encryption in step S3 was received instead of the correct encryption result k, processing ends at this point without any response by the vehicle 3 (S24). In step S23, it is decided whether the current time supplied by the timer 17 falls within interval t. If not, the period of use allotted to the user has expired, and processing ends (S24) without the door unlocking or the vehicle starter being enabled. By contrast, if the current point in time lies within the approved interval, the reference information r obtained through decryption is in step S25 compared with reference information specific to the vehicle 3 stored in the processor 16. In the absence of a match, the user of the transponder 2 has obviously tried to access a vehicle for which he or she has no access authorization, and processing ends with step S24. If the received reference information r matches the stored reference information, the user is authorized, and the processor 16 actuates the assembly 18, so as to unlock the door or disable the engine immobilizer.

Figure 3:
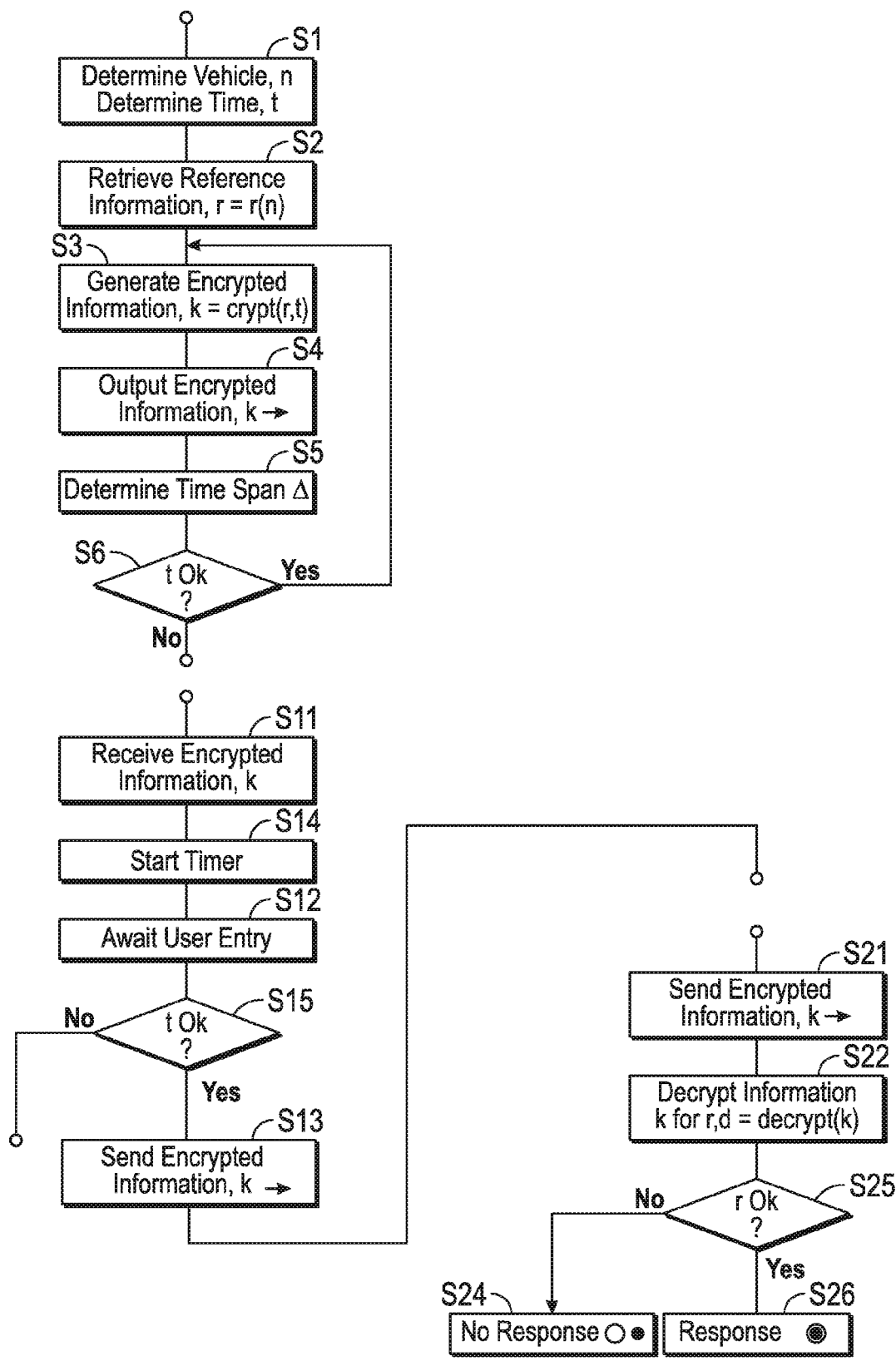
FIG. 3 is a second embodiment of an operating method.

Several steps in the method depicted on FIG. 3 are identical to those in the method according to FIG. 2. Such steps are marked with the same reference numbers on both figures, and will not be explained again in detail.

The first difference between the methods on FIGS. 2 and 3 involves step S3', in which the encrypted information k is not generated based on reference information r and time interval t, but rather based on the current date d, possibly defined more precisely by the current time of day. The encrypted information k is sent out to the mobile phone 2 in step S4, and a prescribed time span$\Delta$, e.g., a day, is allowed to elapse in step S5, after which it is determined whether the current time still lies within the approved time interval t in step S6. If so, the method returns to step S3' to once again encrypt reference information r, this time as a function of the now current time d, and send a new text message in step S4. In this way, the mobile phone receives a new message from the management unit with information k newly encrypted at the respective current time d throughout the approved time interval t after the respective time span $\Delta$ has elapsed.

Steps S11 and S12 of the transponder 2 are again the same as on FIG. 2, but receiving the text message in step S11 is immediately followed by starting the timer 13 of the transponder in step S14. The timer 13 is set up to measure a time interval t' whose length corresponds to the wait time $\Delta$ or, to account for possible delays in text message transmission, slightly exceeds $\Delta$. If the user actuates the mobile phone 2 in step S12 so as to thereby unlock the vehicle door or disable the engine immobilizer, the processor 11 first checks whether the time span t' measured by the timer 13 is still running in step S15. Only if this time span t' has not elapsed is the encrypted information k transmitted to the vehicle 3 in step S13.

Decrypting information k on the vehicle side in step S22 yields the reference information r and time d at which the text message was sent out via the access management system 1. Since the mobile phone 2 only sends the encrypted information k if it has a valid approval in this embodiment of the method, checking the encrypted information in terms of the vehicle 3 can be confined to determining whether k is a valid encryption result and whether the received reference information r matches the stored reference information (S25).

Figure 4:
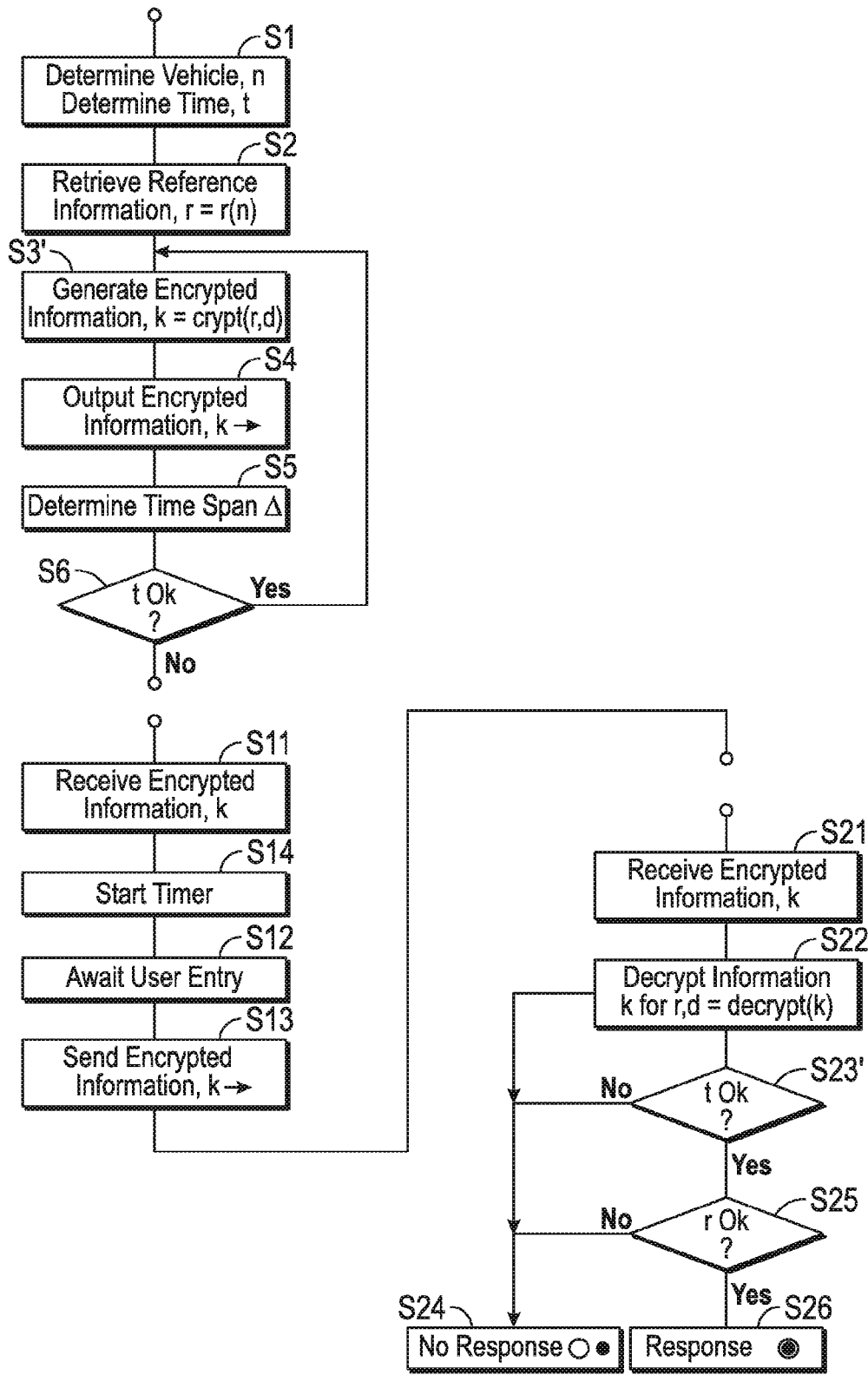
FIG. 4 is a third embodiment of an operating method.

In the embodiment of the method depicted on FIG. 4, procedural steps S1-S6 are identical to those on FIG. 3 in terms of the access management system 1, while procedural steps S11-S13 are the same as those on FIG. 2 with regard to the mobile phone 2. The encrypted value k is again received in step S21 and decrypted into reference information r and the date sent d in step S22. If decryption is successful, a check is performed in step S23' to determine whether the current time supplied by the timer 17 does not come after encryption time d by more than the time span. If this is the case, the access authorization is valid, and access is granted in step S26 if the reference information r also matches.

Figure 5:
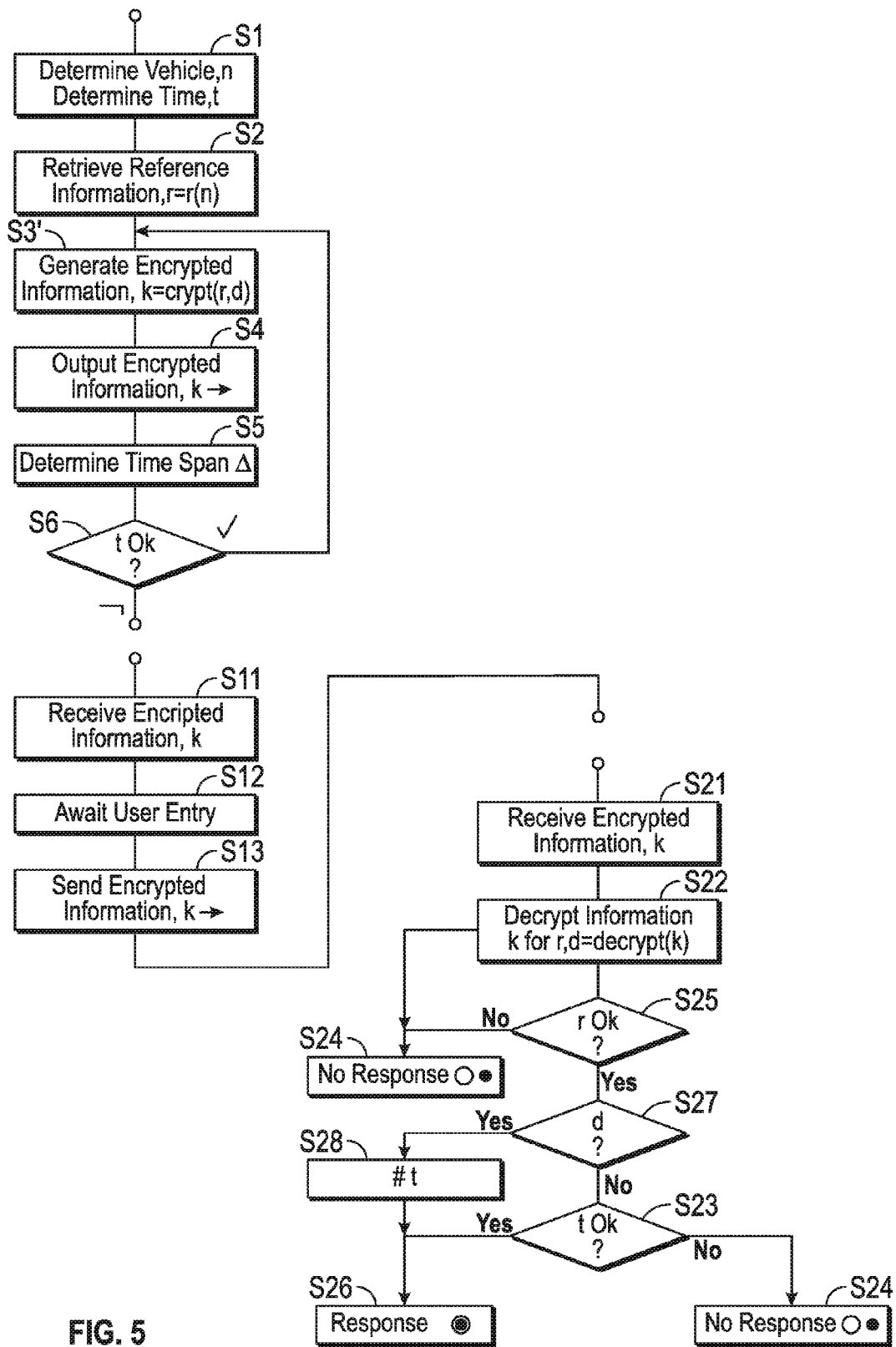
FIG. 5 is a fourth embodiment of an operating method.

The method on FIG. 5 is identical to the one on FIG. 4, to include the decryption step S22 as well. If decryption is successful, the ensuing check S25 determines whether the transmitted reference information r matches the stored reference information. If so, a check is performed in step S27 to determine whether the date d was transmitted for the first time. If so, the timer 17 is initiated in step S28 before the method proceeds to step S26. By first transmitting information k from the transponder 2 to the vehicle 3, the user sets in motion a time span with durationΔ, in which he or she can use the vehicle. If information k is again transmitted to the vehicle after this time interval has elapsed, a determination is made in S23 that the timer 17 has expired, and use of the vehicle 3 is denied (S24).

While at least one exemplary embodiment has been presented in the foregoing detailed description, it should be appreciated that a vast number of variations exist. It should also be appreciated that the exemplary embodiment is only an example, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

The invention claimed is:

1. A method for controlling an electronically-secured device by means of a transponder comprising:
   sending access authorization information from an electrical access management system to the transponder;
   receiving the access authorization information at the transponder via a mobile communication link;
   transmitting the access authorization information from the transponder to an electrically-secured device;
   activating a function of the electrically-secured device when the received access authorization information matches reference information belonging to the electrically-secured device;
   generating time limit information after access authorization information has been received by the transponder, wherein the electrically-secured device specifies a validity period of the access authorization information, and checks the time limit information; and
   activating a function of the electrically-secured device only within the validity period of the access authorization information.

2. The method according to claim 1 wherein the device comprises an assembly of a motor vehicle.

3. The method according to claim 2 wherein transmitting the access authorization information from the transponder to an electrically-secured device the device comprises an engine immobilizer of the motor vehicle.

4. The method according to claim 1 wherein transmitting the access authorization information from the transponder to an electrically-secured device further comprises transmitting encrypted access authorization information from the transponder to the electrically-secured device.

* * * * *